March 14, 1967  O. WEISS  3,309,518
METHOD OF AERIAL PROSPECTING WHICH INCLUDES A STEP OF
ANALYZING EACH SAMPLE FOR ELEMENT CONTENT, NUMBER
AND SIZE OF PARTICLES
Filed July 1, 1963
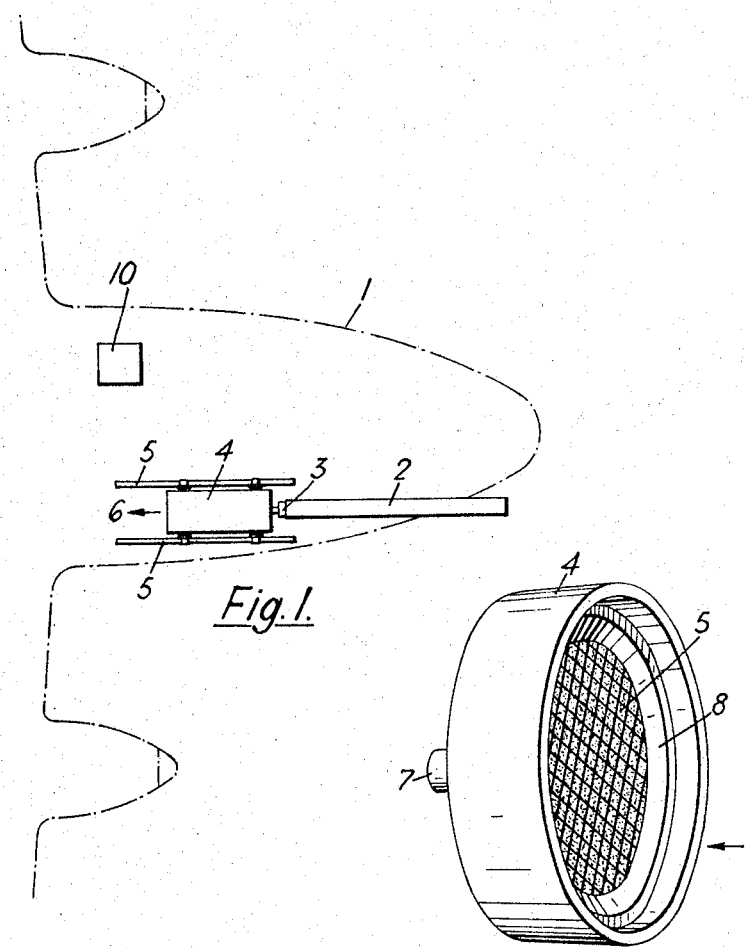
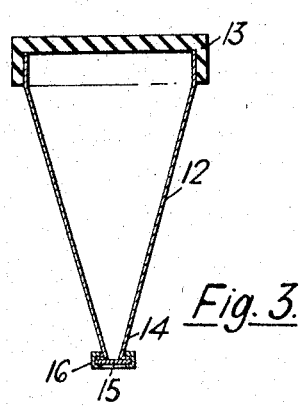
Inventor
Oscar Weiss
By
Kenron, Palmer, Stewart & Estabrook
Attorney United States Patent Office 3,309,518
Patented Mar. 14, 1967

3,309,518
METHOD OF AERIAL PROSPECTING WHICH INCLUDES A STEP OF ANALYZING EACH SAMPLE FOR ELEMENT CONTENT, NUMBER AND SIZE OF PARTICLES
Oscar Weiss, 15 North Road, Dunkeld West, Johannesburg, Transvaal, Republic of South Africa
Filed July 1, 1963, Ser. No. 292,058
8 Claims. (Cl. 250—49.5)

This invention relates broadly to geophysical exploration and more particularly to aerial prospecting for mineral deposits. Various methods of aerial prospecting are already known but none of these can identify the actual elements present in a mineralised area. Most of such aerial methods rely on magnetic and electromagnetic induction measurements which serves to detect magnetic and electromagnetic anomalies. Such anomalies in the great majority of cases are caused by economically useless rocks and minerals so that even after the aerial operations are complete it is necessary to carry out a more detailed investigation at ground level.

For example, the present method of aerial magnetic prospecting for nickel has to depend on magnetic anomalies caused by magnetic nickeliferous pyrrhotite. In some cases however the pyrrhotite is not magnetic and in other cases magnetic pyrrhotite may contain no nickel. Moreover magnetic anomalies may be caused by magnetic rocks of economically valueless minerals. Similarly, airborne electromagnetic induction methods may react to sulphide mineralisation without containing any valuable metals, while at the very best only nickel associated with massive sulphides can be detected.

It is an object of the invention to identify the specific elements persent in mineral deposits, as a direct result of aerial prospecting. It is a further object to determine the location of and the approximate extent of mineral deposits directly by means of aerial prospecting methods.

My invention is based on the discovery that minute particles of outcropping mineralised rocks or soil are carried by the air in the form of so-called "aerosols" and that by the use of particularly sensitive methods of analysis it is possible to determine the identity of the elements in these particles and thus to identify the nature of the ore deposits. Broadly speaking therefore the method of my invention comprises collecting airborne particles of minerals and analysing said particles for the elements they contain. This by itself may be extremely useful in a large number of cases. In various parts of the world thousands of aerial magnetic and electromagnetic anomalies have been mapped during recent years. Although these maps are in existence the identity of the metals causing the anomalies is frequently not known and it may not be economic to carry out a detailed analysis at ground level. By the method of my invention it is a simple matter to collect particles in the air over the area of these anomalies and thus to determine the nature of the deposits.

In addition, however, it is possible not only to determine the inentity of the elements contained in mineralised rocks and soils but also the location of the mineral deposits and for this purpose the particles collected need to be analysed not only for the content of elements but also for the number and size distribution of the particles of elements of specific importance. If this is done I find that by the application of statistical methods it is possible to locate centers of mineralisation with considerable accuracy because the largest particles of the elements derived from mineralisation on the ground occur in largest numbers in the air immediately above the area of mineralisation, after applying corrections for wind velocity and direction.

The necessary collection of particles can be obtained from aircraft, helicopters, balloons, rockets or other form of airborne vehicle. The position of the airborne vehicle is determined by means of cameras and/or radar techniques well-known to those skilled in the art of aerial surveys and such positions are correlated with the particles collected. If a complete survey is to be carried out, the area in question needs to be covered by a series of flight lines.

Flight lines would be, for regional reconnaissance purposes, 2 miles apart and, for normal reconnaissance, 1 mile apart, so that the results of 20 square miles would be on each record of regional reconnaissance and of 5 to 10 square miles for normal reconnaissance. Thus, the reconnaissance of a large area of 10,000 square miles would require from 500 to 1,000 records.

Assuming that 10 records could be analysed per working day per analysing instrument, the time required for obtaining the above results would be from 50 to 100 working days per instrument, i.e. from about 2 to 4 months. The time could be reduced by using a sufficient number of analysing instruments. The coverage could be increased very greatly by eliminating the detailed analysis of blank records.

The analysis of about 6,000 reconnaissance and detailed follow-up records covering something like 40,000 square miles per year, i.e. an area 400 miles long and 100 miles wide. The length of traverses could be of the order of, say, 50,00 linear miles, including detail work. To this I add 10,000 miles flying to reach areas of interest from bases and return. Thus, the annual flying to keep two instruments busy would be, about, 60,000 miles, covering surveys over 40,000 square miles. If such reconnaissance indicates the presence of some metal of economic interest, then detail exploration has to be the next step. In the detail survey the larger area is subdivided into smaller units and aerosol sampling is done along closer spaced flight lines and done either continuously or (more practically) at suitable frequent intervals. Assuming that the aircraft flies at the speed of 120 miles per hour, then a distance of 2 miles is covered per minute. By sampling the aerosols for periods of say 5 minutes per collector area, aerosol samples of a 10 mile stretch are accumulated on each collector. By sampling for longer or shorter periods the stretch of samples of aerosols on a collector or on a part of a collector is controlled. For reconnaissance of a large area the stretches are kept large at the start and are decreased as warranted by results.

As mentioned above my method relies on the fact that small mineral particles are carried up by air currents so that the method is limited to dry land surfaces free of thick vegetation and of snow and ice. In some cases the natural air currents may not be sufficient to produce an adequate concentration of particles and it may be necessary to stimulate air currents by burning the grass or trees or by exploding charges dropped from the aircraft. In specially selected areas it is possible to lift particles from the ground surface by causing air turbulence through the rotors of low flying helicopters or by dragging mechanically or electrically operated fans at the ends of cables or tubes lowered from helicopters or from types of other aircraft, or by blowing compressed air from tubes lowered from the aircraft.

The particles floating in the air may be sampled either continuously or intermittently and methods of particle collection from the air are well known from techniques employed in the study of industrial air pollution. One method of collection and the subsequent analysis of results will now be described with reference to the accompanying drawings, in which:

FIGURE 1 is a diagrammatic view showing the arrangement of collecting apparatus in the nose of an aircraft;

FIGURE 2 is a perspective view to an enlarged scale of a filter membrane used in the apparatus of FIGURE 1;

FIGURE 3 is a diagrammatic sectional view of a tube used for concentrating material collected by the filter of FIGURE 2.

Turning first to FIGURE 1, the nose of an aircraft is shown in outline as 1, and a sampling tube of 3″ diameter shown as 2 projects forwardly at one side. This sampling tube is rigidly mounted and leads to a membrane filter mounted in a holder 3 and secured to the inlet of a vacuum pump shown as 4. This is adjustably mounted on rails 5 which enables it to be retracted in the direction of the arrow 6, so as to allow a fresh filter holder 3 to be fitted in position.

The filter holder 3 is shown in more detail in FIGURE 2, and comprises an annular body 4 formed with a supporting grid 5 for a membrane filter which is held in position by a clamping ring 8. The holder 3 is formed at the rear with a connection 7 for engagement with the inlet of the vacuum pump 4. Both the filter holder and the vacuum pump are available commercially from a variety of sources and may be obtained for example as part of an aerosol collecting kit (sold by Millipore Filter Corporation of Bedford, Mass., U.S.A.).

In addition to the collection apparatus a strip camera indicated diagrammatically as 10 is also mounted in the nose of the aircraft. The filter holders 3 are numbered in succession and during flight a new filter is inserted periodically, at suitable intervals. Each time a new filter is inserted an exposure is taken on the camera 10, and the frames of the film strip are numbered to correspond with the numbering of the filter holders, so that the contents of each filter can be correlated with the area of ground indicated by that frame of the filmstrip.

After a flight or a number of flights over an area to be investigated, the successive filters are then examined for particles of interest. The number and size of particles is small at large distances from the sources and the number of particles is low even in collecting over long stretches of reconnaissance flights. Nearer the sources, i.e. nearer outcropping mineral deposits the size of particles is larger and their number increases, but as the stretches of sampling are decreased in order to pinpoint the source on the ground, the number of particles on any individual collector remains low. I have found that at 500 feet height over outcropping mineralised rocks the number of particles collected on a small membrane filter is of the order of 60 to 100 particles per square inch. The difficulty is to find these particles of 1 to 5 microns of diameter in the relatively vast area of the filter or part of a filter. For the above reasons I have to concentrate the particles from the large area of the collectors to much smaller areas.

For this purpose the membrane is removed from the holder and is treated with a reagent capable of dissolving the material of the filter, but not the particles of interest. The suspension of particles may then be inserted in a tube of the shape indicated in FIGURE 3. The tube is shown as 12 and tapers from a broad end closed by a rubber cap 13 to a narrow end 14 which is only 3 mm. in diameter and is closed by a small aluminium disc 15 held in position by a screw cap 16. The tube 12 is inserted in a centrifuge so that the particles in suspension are collected on the disc 15. This is removed from the tube, is dried and is then ready for analysis.

In order to minimize the final expensive and time-consuming analysis of all filters, the filters may be first investigated for the general presence of particles of interest. Thus the filters may be coated with reagent chemicals in order to detect the presence of metallic particles of economic interest in the aerosols by means of haloes and color indications. An alternative method of eliminating the analysis of filters which contain no particles of interest is to subject the filter or parts of the filter to point source X-ray projection or to X-ray projecting microscopy and to photograph the X-ray picture or observe it on a fluorescent screen. The heavy metal particles show up in the X-ray pictures while the low density particles do not appear. If a filter or parts of a filter show no particles of interest such filters are not analysed. To facilitate preliminary testing of the filters I may collect particles simultaneously on several filters and then compare the results. Alternatively I may compare the results from different parts of a single large filter. The use of several filters at a time permits the use of different types of filters or other form of collector and permits a comparison of the efficiency of such different types.

By concentrating the particles from much larger surfaces the process of analysis is made economically efficient and the analytical process itself constitutes one of the most important features of my invention. This analysis is carried out by an electron probe analyzer of a type which is available from the Cambridge Instrument Company Limited of Cambridge, England, under the name Cambridge Microscan X-ray Analyser. This instrument works by analysing the X-ray emission excited from the surface of the specimen by a beam of electrons focussed into a probe less than one micron in diameter. This electron probe can either be static and directed on to a particular point of interest, or it can be made to scan a raster of up to ½ mm.$^2$.

The X-ray emission passes into an X-ray spectrometer where it is usually dispersed by a curved crystal set to an appripriate angle to reflect characteristic radiation of a selected element. In an alternative arrangement, the X-rays by-pass the crystal and pass directly into the detector (a proportional counter) for analysis by pulse height discrimination.

The amplified signal from the detector consists of short duration pulses which can be used to modulate the brightness of a beam scanning a cathode ray tube, counted by a dekatron scaler, or integrated by a ratemeter and recorded by a pen recorder. The beam of a second cathode ray tube is similarly modulated by the amplified signal from a scintillation counter activated by electrons reflected back from the specimen surface. The scanning of both cathode ray tubes and of the specimen surface is synchronised.

The scanning system is a particularly important feature as it allows an X-ray image, showing the distribution of a selected element over the region scanned, to be displayed side by side with the reflected electron image of the same region at any magnification between 250× and 3000× (at voltages between 10 and 50 kv.). The operator is therefore able to make continual and immediate comparisons between the two images.

The X-ray image gives immediated semi-quantitative information about the distribution of a particular element within the microstructure of the surface and the electron image provides a useful means of identifying the region scanned (it is recognizably similar, but with more depth of focus for a similar resolution, to an optical micrograph photographed with oblique illumination). In addition to topographical information of this kind, the electron image also gives an indication of the differing atomic numbers of the elements present (variations in contrast are caused because more electrons are reflected from heavier atoms).

Both cathode ray tubes have long persistence screens on which the image remains for 20 to 30 seconds before fading. This feature is useful, either for superimposing the images (they can be switched instantaneously from one tube to the other) or for guidance in locating the electron-probe for static quantitative analysis (the probe position is indicated by a bright point of light after the scan is stopped).

Quantitative analysis is carried out by rotating the crystal of the spectrometer to the Bragg angle appropriate to the characteristic radiation of the particular element and either using a pen recorder to plot a peak representative of the concentration or reading off the number of counts in a given time from a dekatron scaler. This peak or reading is then compared with that produced by a pure sample of the same element and corrections are made (if necessary) for effects in the specimen caused by X-ray fluorescence and absorption. An accuracy of ±1.0% is usually obtainable.

An alternative method sometimes used for qualitative analyses of lighter elements is based upon the fact that the energy of pulses from the spectrometer detector varies with the wavelength of the X-rays responsible. If the X-rays are passed direct into the counter without first being reflected by the crystal, they can be analysed after detection by discriminating between the height of the pulses before these are counted and converted into a signal suitable for the ratemeter.

This method of non-dispersive analysis also serves one other useful purpose. The relative heights of pulses caused by all elements present are shown on the pulse monitor, thus giving an immediate indication of the number of major constituents present in an unknown substance and the wavelength ranges that need to be searched to produce positive identifications.

From the foregoing it will be appreciated that this instrument is ideally suited for analysing the particles concentrated on the aluminum disc 15.

The results of a survey made by conducting a series of test flights on five consecutive days, followed by a second series of two test flights five months later over a copper mine and in the Bergland Area of South West Africa illustrate the invention.

The first results of analysis with the electron probe microanalyser identified the particles collected over the copper mine as containing copper as major constituent with traces of nickel, zinc and arsenic. The particle sizes were between 1 and 3 microns.

These flight tests provide that particles of minerals from the ground were floating in the air at about 500 feet height above the ground and that such particles could be collected and the heavy elements (metals) in them could be identified and their size determined. While these conditions applied to an actively producing mine with contamination of the ground by minerals derived not only from outcrops but also from mining activities, the results could not be accepted as decisive when areas of undisturbed mineralised outcrops were concerned.

For the above reasons, selected areas free of mining activities were surveyed where the existence of mineralised outcrops were known from geological data and/or from drilling results.

The first such area was flown over at Hohenwarte, near Windhoek in South West Africa. This is an area of ±3% lead mineralisation. An electron probe microanalysis confirmed the presence of lead in the particles. This demonstrates the application of my invention over outcropping mineralisation free from any artificial disturbance. The weather was free of ground wind, but thermal air connections caused strong turbulence as felt by bumping in the four-engined Heron aircraft. The lead particles were 5 microns in diameter.

These results have been repeated at other locations where copper, lead, zinc, cerium, sulphur, iron, nickel, manganese, titanium, chrome, cobalt and tin particles have been identified and correlated with known mineralisation. As control, I have also sampled the air over areas removed from mineralised outcrops and the negative results proved that metal particles of detectable concentration only exist over and in the vicinity of mineralised outcrops and/or mineralised soils.

After examining selected particles for specific elements of interest it is then frequently desirable to carry out a quantitative analysis. As previously described the particle is scanned while at the same time carrying out automatic adjustment of the Bragg angle and using a pen recorder to plot the concentration of the number of counts in a given time from a dekatron scaler. Traces were plotted with a number of counts measured on an arbitrary scale as ordinate and Bragg angle as absscissa. The various peaks correspond to those in the X-ray spectra of the elements concerned, forming series which, in the standard terminology, are identified as K, L, etc. Each element emits radiation of different wavelengths, referred to, again in accordance with standard terminology, as $\alpha$ and $\beta$ bands, the intensities being different in each band.

The heights of the peaks indicate the relative proportions of the different elements present.

In general any particular survey will be carried out only in respect of a small number of elements of interest, for example two or three. When the particles from each membrane filter have been concentrated as already described, it is necessary to analyse each individual particle of interest, so as to identify any such particles containing an economic proportion of the element or elements in question. The size of each particle of interest is also measured and the number and size of the particles from each filter are recorded and used to plot a size distribution profile and/or contour. A graph may be prepared in which the number of particles are plotted as ordinate against distance along a flight line as abscissa. Such a graph may represent the total number of particles of one specific element, regardless of size, and it may have a relatively sharp peak at a point on the flight line which (after corrections for wind) represents the approximate center of mineralisation. In order to check on this, further curves may also be plotted if required; for example a curve to represent the number of particles of one micron diameter. This curve might have a much more rounded peak and fall off more gradually. This would be accounted for by the fact that these smaller particles are more widely distributed than the larger particles by air currents and so-forth.

Of course, the centre of mineralisation may not lie directly along any one specific flight line, although in general the curves plotted for such a flight line will correspond in shape. Further information may thus be obtained by the plotting of size-distribution contours which may be derived directly from a number of profiles, and no example is therefore shown in the drawings. Still further curves may be plotted from results obtained from the collection of particles at different heights above the region of interest.

From the foregoing it will be appreciated that both the nature and the location of mineralisation may be determined with considerable accuracy without the need for any surface investigations at all.

I claim:
1. A method of prospecting an area of the earth's crust for solid metalliferous mineral deposits existing therein which comprises:
   (a) collecting on separate extended collector surfaces successive samples of airborne particles at a plurality of different positions at least 500 feet above the earth's surface,
   (b) determining the positions at which each of said samples are collected relative to the earth's surface,
   (c) analyzing each sample for element content, number and size of particles, and
   (d) correlating the results of said analyses with the determined positions of collection whereby to determine the position of mineral deposits in the earth's crust.

2. The method of claim 1, wherein said particles are analysed by electron probe analyser to determine the nature and size of metal particles.

3. The method of claim 1, including treating said particles on said surface with a chemical reagent whereby to detect particles of economic interest.

4. The method of claim 1, wherein said particles on said surface are subjected to a point source X-ray projection to produce an X-ray picture and said X-ray picture is photographed.

5. The method of claim 1, wherein said particles on said surface are subjected to X-ray projecting microscopy.

6. The method of claim 1, in which said position of collection is determined photographically.

7. The method of claim 1, in which said position of collection is determined by radar.

8. The method of claim 1 including plotting size distribution profiles and contours for elements detected in said area.

References Cited by the Examiner

UNITED STATES PATENTS

| | | | |
|---|---|---|---|
| 2,317,329 | 4/1943 | McLachlan | 250—51.5 |
| 2,494,441 | 1/1950 | Hillier | 250—49.5 |
| 2,722,998 | 11/1955 | Hall | 73—28 |
| 3,059,470 | 10/1962 | Baldwin et al. | 73—28 |
| 3,143,648 | 8/1964 | Bradley et al. | 250—43.5 |

OTHER REFERENCES

"The Geological Survey's Work on Development of Prospecting Tools, Instruments, and Techniques" by F. W. Stead, TEI–211, May 1952, 24 pp.

RALPH G. NILSON, *Primary Examiner.*

W. F. LINDQUIST, *Assistant Examiner.*